United States Patent [19]

Kukreja

[11] 4,146,912
[45] Mar. 27, 1979

[54] DISK INTERLOCK MECHANISM

[75] Inventor: Jagmohan S. Kukreja, Claremont, Calif.

[73] Assignee: Perkin-Elmer Corporation, Norwalk, Conn.

[21] Appl. No.: 823,973

[22] Filed: Aug. 12, 1977

[51] Int. Cl.² .......................... G11B 5/82; G11B 25/04
[52] U.S. Cl. ...................................... 360/99; 346/137; 360/133
[58] Field of Search .............................. 360/99, 97–98, 360/86, 133, 135; 206/444; 346/137

[56] References Cited

U.S. PATENT DOCUMENTS

| | | | |
|---|---|---|---|
| 3,593,327 | 7/1971 | Shill | 360/97 |
| 3,800,325 | 3/1974 | O'Brien | 360/133 |
| 3,815,150 | 6/1974 | Stoddard et al. | 360/99 |
| 3,899,794 | 8/1975 | Brown, Jr. | 360/86 |
| 3,940,793 | 2/1976 | Bleiman | 360/99 |

*Primary Examiner*—Alfred H. Eddleman
*Attorney, Agent, or Firm*—Henry M. Bissell

[57] ABSTRACT

An interlock mechanism in a flexible disk drive unit to protect the disk against damage by the disk engagement assembly. The mechanism operates to block the engagement assembly from moving into a position of engaging the disk when the disk is not fully inserted in the drive.

10 Claims, 9 Drawing Figures

DISK INTERLOCK MECHANISM

BACKGROUND OF THE INVENTION

1. Field of the Invention

This invention relates to disk drives for flexible or so-called "floppy" disks and, more particularly, to apparatus associated with such drives for protecting the disks against mutilation by improper operation of the disk engagement assembly of the drive.

2. Description of the Prior Art

Floppy disk drive units, or "disk drives", are small information storage systems which are used for information storage in small mini-computers, off-line data terminals and other processors of digital information where low cost, compact storage and processing of relatively limited quantities of digital data is desired. These functions can be, and have been, performed by small tape cassette units. However, floppy disk drives possess certain advantages over the cassette tape drives in that the stored data can be accessed more readily and a considerable advantage in cost is provided, with respect to both the drive unit and the storage media.

A floppy disk drive typically contains a magnetic head for writing and reading data stored on the opposite sides of a flexible disk having magnetic recording surfaces, a positioning motor for positioning the heads for access to the various tracks on the disk, a drive motor for rotating the disk, and associated circuitry for transferring the data in electrical signal form between the heads and the plug interface with associated equipment. The disk drive also typically includes a pivoted access door coupled to a pivoted disk holder plate (carrier) which carries the upper member of a two-part disk engagement assembly. The other disk engagement member is mounted on the drive spindle below the position of the disk when it is inserted in the drive. The disk and its jacket are both provided with central holes, the jacket hole being larger in diameter than the disk hole. The upper disk engaging member is tapered or truncated cone-shaped with the smaller end down and serves to center the disk relative to the spindle as the upper member is moved downwardly through the disk hole into engagement with the spindle-mounted member, in which position it engages the disk against the lower, spindle-mounted member for rotation therewith. The upper disk engagement member and the plate on which it is rotatably positioned are moved toward or away from the disk and spindle by closing or opening the disk drive door to which the plate is pivotably connected.

It will be appreciated that it is essential to protect the disk, as the storage medium, from damage. The loss of a memory disk by mutilation with nearly half a million bytes of data stored thereon can be very crucial. It has been found that the disks as inserted in the drive are not always moved all the way into the operating position. In such a case, closure of the door to lower the disk plate and upper engagement member may serve to move that member down against the disk, rather than into the hole. When this occurs, the portion of the disk immediately surrounding the hole is mutilated and the disk is rendered valueless with an attendant loss of the data stored thereon.

Various systems have been employed to preclude the possibility of operating the disk engagement mechanism when the disk is not fully inserted into the unit. For example, attempts have been made to deal with this problem by interlocking the movable elements coupled to the upper disk engagement member with the disk and its jacket. One such attempt has comprised a switch and solenoid combination. However, such an arrangement is unsatisfactory in that it introduces undue complexity and cost into the system. The arrangement takes up space and consumes power, besides presenting an element of unreliability. Other arrangements have included door-blocking arrangements and the like, all without providing a satisfactory solution to the problem.

SUMMARY OF THE INVENTION

In brief, arrangements in accordance with the present invention comprise a pair of pivoted, spring-loaded interlock members mounted on the respective side brackets which support the door and the associated electrical circuit board, and contain the guide slots for the disk and jacket. At the rear, or distal, ends of the interlock members, a cam surface is provided in a position to be contacted by the inner corner of the disk jacket when it is in the fully inserted position. Adjacent the position of the cam surface, the side bracket is relieved or cut away to the guide slot so that the disk jacket as it approaches the fully inserted position projects through the cut away portion to engage the cam surface of the interlock member. Such engagement of the cam surface causes the interlock members to rotate about their pivot mounting pins to a position where the proximal ends of the interlock members are in interfering or blocking relationship with correspondingly located extension arms protruding outwardly from the plate in which the upper disk-engagement member is mounted. It is in this position that mutilation of the disk can occur if the upper engagement member is brought downwardly against the disk. Further insertion of the disk and jacket into the home position causes the interlock members to rotate farther to a position where the proximal ends clear the plate extension arms, thus permitting the door to be closed and the plate to be lowered with the upper engagement member being moved through the opening in the disk to engage the lower member so that the disk may be rotatably driven.

This arrangement in accordance with the present invention provides a simple, uncomplicated, reliable and low-cost solution to the problem of premature actuation of the disk engagement assembly with resulting mutilation of the disk. The interlock member itself is fabricated of a low-cost, rigid and rugged plastic material such as reinforced polycarbonate, the same material as is employed for the molded plastic support bracket and disk guide member. The biasing spring is a simple flat leaf spring which is mounted on the interlock member in a manner so as to bear against the disk drive frame in generating the pivoting force. The interlock member is very simply mounted on top of an adjacent flat surface of the disk guide member by means of a pivot pin inserted therein. The mechanism works reliably and is completely effective in preventing damage to the disk due to movement of the disk engaging member toward the spindle when the disk is not fully inserted into the home or play position.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

Figure 1:
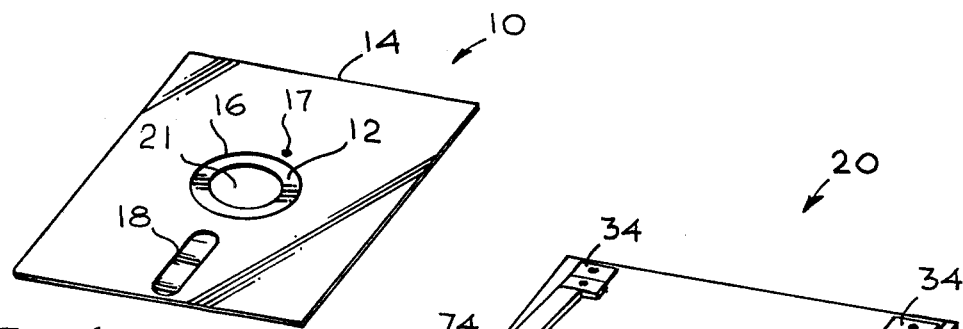
FIG. 1 is a view representing a floppy disk with which the present invention is associated.

FIG. 1 illustrates a floppy disk assembly 10 which is used in disk drives employing the present invention. As shown in FIG. 1, the assembly 10 includes a flexible magnetic disk 12 encased in a semi-rigid jacket 14. In this assembly, the disk 12 is able to rotate freely within the jacket 14 when driven by associated elements within a disk drive. The jacket 14 is provided with a central opening 16, an index access opening 17 and an opening 18 for permitting access of the read/write heads to the disk 12. The disk has a central opening 21 of lesser diameter than the central opening 16 in the jacket 14. The jacket opening 16 is of larger diameter than the disk opening 21 to provide room for the drive elements of the disk drive to grip the disk 12 to rotate it in operation. These elements comprise a truncated cone-shaped member designed to extend through the opening 21 of the disk 12 and engage a spindle in the drive. If the assembly 10 is not in the proper position within the associated dive when the cone-shaped member is moved downwardly to enter the opening 21, the member will instead make contact with the surface of either the disk 12 or the jacket 14. If the displacement of the assembly 10 from its proper operating position is such that the downwardly directed cone-shaped element contacts the jacket 14, no damage will be done to the disk and the operator upon becoming aware of the misalignment can correct the situation. However, should the misalignment of the assembly 10 from its proper operating position be only slight, so that the cone-shaped member contacts the disk 12 in the unprotected region between the disk opening 21 and the opening 16 of the jacket 14, the disk 12 will very likely be mutilated before the operator can realize that there is a problem with disk alignment. The present invention is directed to preventing the occurrence of such mutilation.

Figure 2:
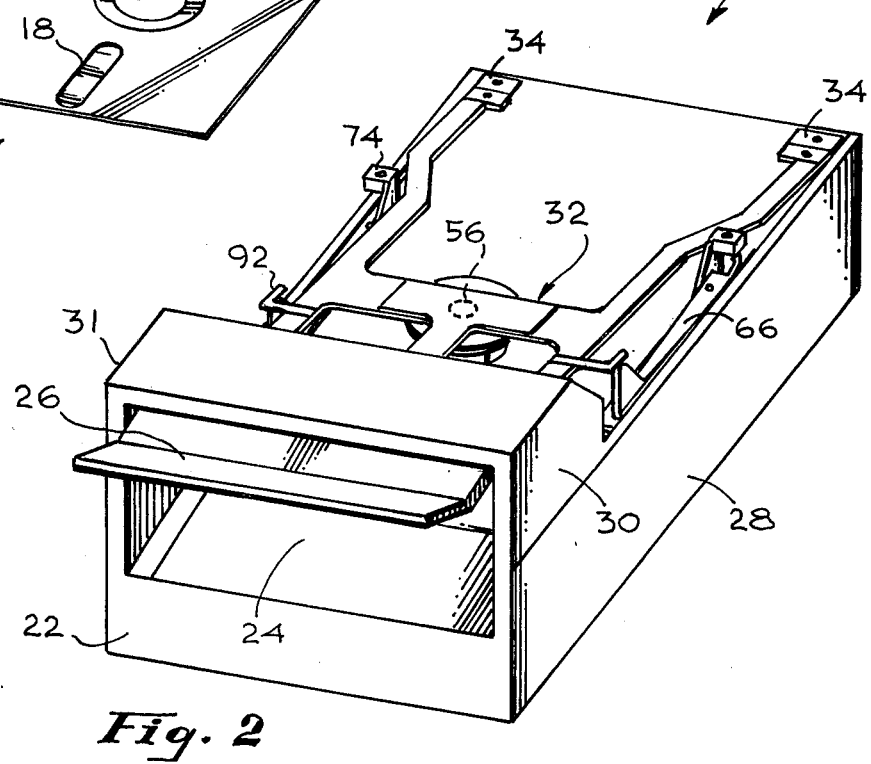
FIG. 2 is a perspective view with portions omitted showing the salient parts of a disk drive employing the invention.

FIG. 2 is a rendering of a disk drive for recording information on and reading it from a disk 12 of the floppy disk assembly 10 of FIG. 1. For purposes of illustration in FIG. 2, the circuit board assembly normally mounted upon the top of the unit is not shown. The drive 20 of FIG. 2 is shown with a front 22 having a disk access opening 24 through which is shown projecting the disk drive door 26 in the open position. Also shown is a side panel 28 upon which is mounted a disk guide and bracket member 30. A similar member 31 is shown on the left side of the unit 20. Also shown is a carrier 32 mounted at the rear by flexible hinge members 34. The carrier 32 is also pivotably mounted to the door 26 so that the front end of the carrier 32 moves upwardly to a release position when the door 26 is opened and downwardly to a play position when the door 26 is closed.

Figure 3:
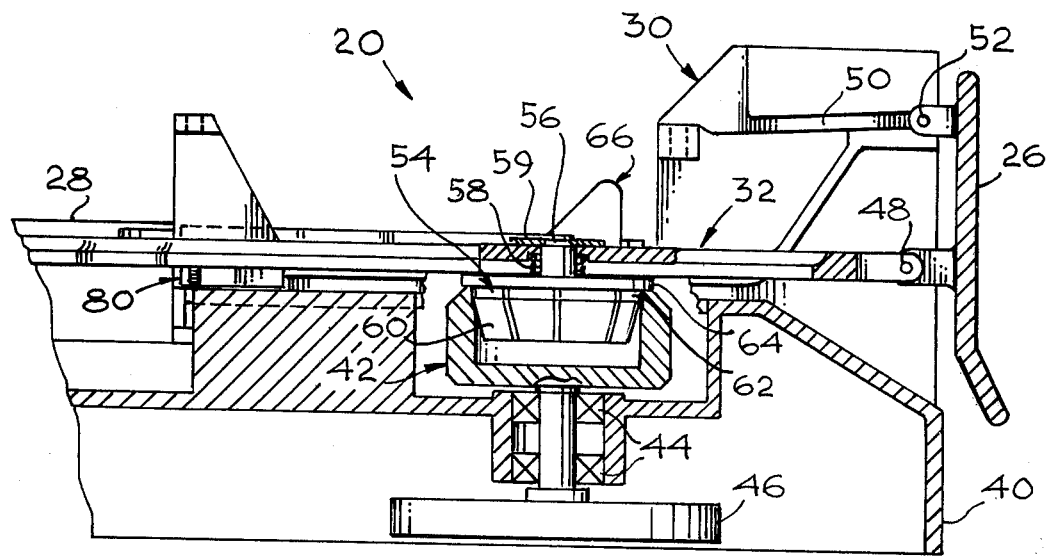
FIG. 3 is a side sectional view of a disk drive unit showing the parts of interest to the present invention.

As shown in FIG. 3, which is a sectional view of the front portion of the disk drive 20 of FIG. 2, taken along a vertical longitudinal plane as viewed from the left-hand side, the disk drive 20 comprises a molded frame member 40 on which the guide 30 is mounted and which also supports the drive spindle 42 by means of bearings 44. The drive spindle 42 is driven by its associated drive motor (not shown) by means of belt coupling to the pulley 46. Also as shown in FIG. 3, the door 26 is pivotably mounted to the carrier 32 by a pin 48 and also engages a slot 50 in the guide 30 by means of a slide pin 52. This connection permits the door 26 to rotate counterclockwise when being rotated toward the open position, pivoting about the pivot pin 48 as the slide pin 52 moves rearwardly along the profile of the slide 50. In so doing, the front end of the carrier 32 is raised from the position shown. As shown in the closed position, the carrier 32 is essentially horizontal.

The carrier 32 carries or supports a rotatably mounted, cone-shaped drive member 54 which mates with the spindle member 42 in frictionally engaging and driving a floppy disk, such as the disk 12 of FIG. 1. The mounting of the cone-shaped drive member 54 to the carrier 32 includes a shaft 56, a compression spring 58, and a retainer plate 59. The member 54 has a tapered pilot portion 60 for entering the opening 21 of the disk 12 (FIG. 1) and centering the disk in drive position. The member 54 also has a cylindrical portion 62 for engaging the spindle 42 so as to be driven thereby, and an extended shoulder portion 64 which serves to grip the disk 12 against a corresponding portion of the spindle 42.

Figure 4:
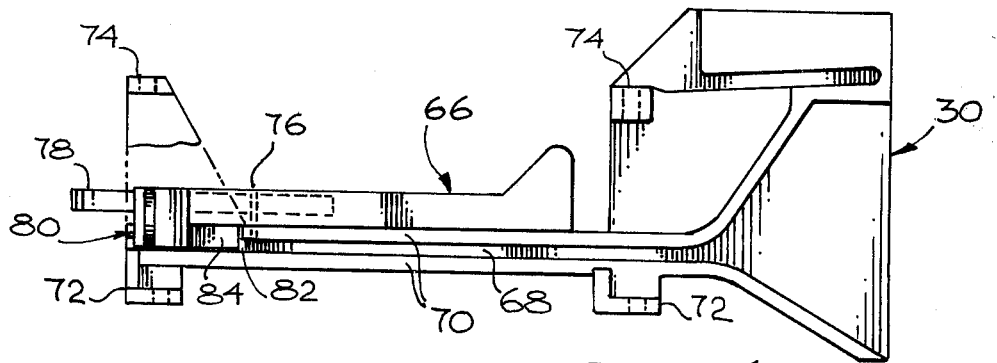
FIG. 4 is a side elevational view, partially broken away, of a guide and interlock arm assembly in accordance with the present invention.
Figure 5:
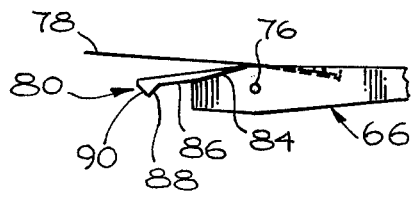
FIG. 5 is a bottom view, partially broken away, of the interlock arm of FIG. 4.

Details of the disk guide 30 together with the associated disk interlock arm 66 are better shown in FIGS. 4 and 5. As shown in FIG. 4, the disk guide 30 includes a disk guide slot 68. The disk guide slot 68 is defined by a pair of guide rails 70 which diverge at the front for ready insertion of the floppy disk. A pair of brackets 72 are provided for mounting the disk guide 30 to the disk drive frame and an additional pair of brackets 74 are provided for attaching the associated electrical board (not shown) thereto. The disk interlock arm 66 is pivotably attached to the disk guide 30 by means of a small pivot pin 76 which permits the interlock arm 66 to swing freely about the pin 76 as the interlock arm 66 rests on the upper surface of the disk guide 30. A straight leaf spring 78 is mounted on the interlock arm 66 in a position to bear against the side frame member 28 to urge the interlock arm 66 to a first, rest position. The interlock arm 66 is provided with a cam profile which is operative along a downwardly depending portion 80 to engage a disk assembly, such as 10, as it moves to the rearward end in the slot 68. It will be noted that the slot 68 is relieved and open at a rearward section 82 to permit the disk jacket to make contact with the profiled lower rear or distal portion 80 of the interlock arm 66.

The cam profile in the distal portion 80 of the disk interlock arm 66 can best be seen in FIG. 5 as beginning with a lead-in ramp portion 84, followed by a flat portion 86, a rising portion 88, and a downwardly inclined portion 90. In operation, as a disk assembly 10 is slid along the guide slot 68, its rear corner (one on each side) engages the ramp portion 84 on the cam profile section 80 of each interlock arm 66, causing the interlock arm 66 to rotate against the force of the sring 78 from the first, rest or released position to a second, interfering position. Further insertion of the disk assembly 10 merely moves the inward corner of the disk jacket 14 along the horizontal surface 86 so that the interlock arm 66 remains in the second, interfering position. As the disk assembly 10 is slid further inward to its home position, the corner of the jacket rides along the second incline cam surface 88, thus rotating the interlock arm 66 farther against the urging of the spring 78 to a third, clear or bypass position. In the clear position as well as in the rest position of the interlock arm 66, the carrier 32 is able to lower the driven member 54 while in the second, interfering position corresponding to the corner of the jacket 14 moving along the flat cam surface 86, the interference arm blocks the carrier 32 so that it cannot be lowered. The flat cam surface 86 is approximately equal in extent to the distance between the edge of the opening 21 in the disk 12 and the edge of the opening 16 in the jacket 14 so as to prevent the carrier from lowering the driven member 54 in this critical region which would cause mutilation of the disk 12.

Figure 6:
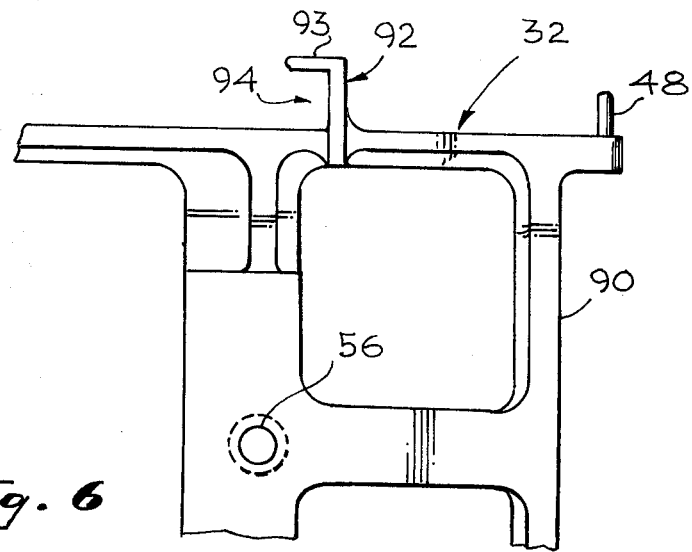
FIG. 6 is a partial plan view showing constructional details of the carrier used in the present invention.

Details of construction of carrier 32 which cooperate with the interlock arm 66 to provide the interlocking operation are shown in FIG. 6. Preferably the carrier 32 is a metal frame 90 containing the pivot pin 48 for attachment to the disk drive door 26 and it rotatably supports the shaft 56 of the spindle driven member 54. Extending outboard of the frame 90 is an L-shaped interlock projection 92 having an ear 93 and a bypass aperture 94. This is located above the interlock arm 66, blocking the downward movement of the carrier 32, when the disk assembly 10 is inserted within the disk drive 20 within a predetermined distance away from the home or operative position of the assembly 10.

Figures 7A, 7B, 7C:
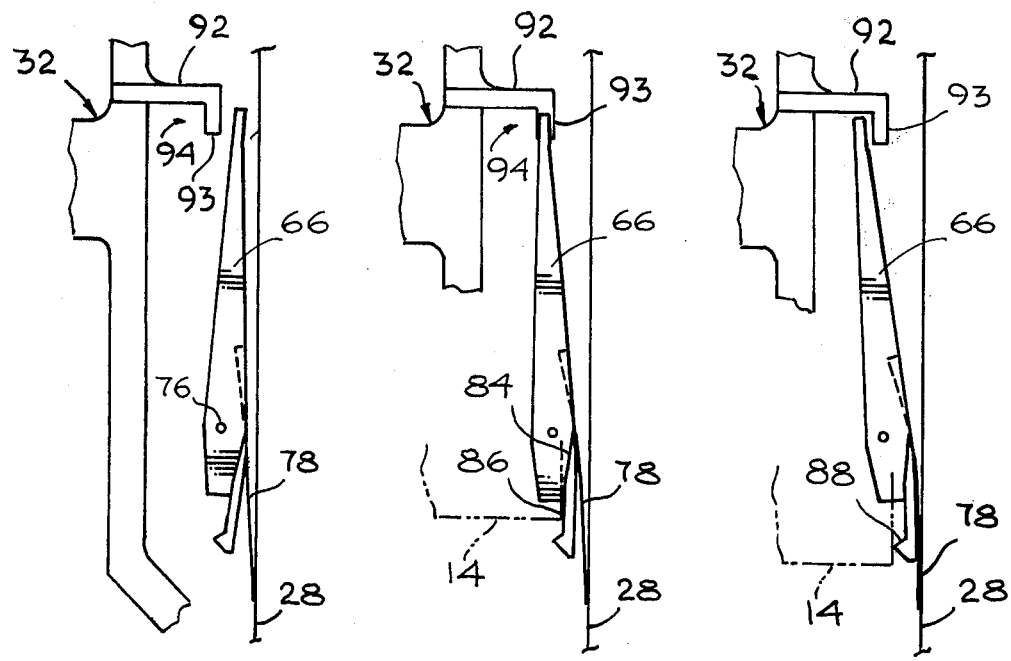
FIGS. 7A–7C are schematic views, showing portions of the arrangement of the present invention in operation.

This particular interlocking function is illustrated schematically in FIGS. 7A, 7B and 7C. In FIG. 7A, the interlock arm 66 is shown in the first, rest position, to which it is urged by the spring 78 bearing against the adjacent frame member 28. This is the position which is assumed by the interlock arm 66 when no disk assembly 10 is within the disk drive 20 or, if inserted, is not within the critical distance of the home position. FIG. 7B shows the second, interfering position assumed by the interlock arm 66 due to the rearward corner of the disk jacket 14 contacting the cam profile portion 80 of the arm 66. To get to the position of the interlock arm 66 shown in FIG. 7B, the rear corner of the jacket 14 will have moved along the ramp surface 84 and into the flat portion 86, pivoting the interlock arm 66 from the first rest position of FIG. 7A to the interfering position of FIG. 7B. In this latter position, the forward end of the interlock arm 66 is directly under the protruding ear 93 which is part of the projection 92 of the carrier 32. In this position, the carrier is prevented from any possibility of being lowered because of the interference between the interlock arm 66 and the carrier ear 93. This blocking or interference position is maintained by the interlock arm 66 for a range of positions of the disk assembly 10 corresponding to the critical dimension or spacing of the region between the disk opening 21 and the jacket opening 16 (FIG. 1). Further insertion of the disk assembly 10 to the home or operating position causes the corner of the jacket 14 to move along the incline surface 88, thus rotating the interlock arm 66 further against the spring 78 until the forward or proximal end of the arm 66 clears the carrier protruding ear 93. This corresponds to the disk assembly 10 being in the proper position for the lowering of the spindle driven member 54 through the opening of the disk 12. Thus, the driven member 54 may be lowered by closing the door 26, lowering the plate or carrier 32 and moving the surface 60 through the opening 21 in the disk 12 without doing any damage to the disk. In the reverse sequence, opening of the door 26 raises the carrier 32 with its driven member 54, thus permitting the disk assembly 10 to be withdrawn. Withdrawing the disk assembly 10 permits the interlock arm 66 to rotate counterclockwise under the urging of the leaf spring 78 to its previous rest position as shown in FIG. 7A. Thus, the interlock mechanism effectively acts to prevent any mutilation of the disk 12 by premature lowering of the carrier 32 and driven member 54 against an exposed portion of the disk 12. In order to permit the carrier 32 and its associated driven member 54 to be lowered sufficiently to contact the disk 12, the disk assembly 10 must be in the home or operative position. If it is out of that position by a limited distance, movement of the carrier 32 is interfered with by the forward or proximal end of the interlock arm 66 contacting the carrier projecting ear 93. This mechanism is cheap to manufacture, is extremely effective in operation, and is economical of space while requiring no power for its operation. It provides superior reliability in a small and effective structural combination, easy to manufacture and assemble. As such, it is clearly an improvement over prior art arrangements for the same or similar purpose.

Although there have been described hereinabove particular arrangements of a disk interlock mechanism for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. Interlock apparatus for protecting a flexible magnetic disk mounted within a protective jacket against mutilation by a centering device comprising:
   guide means having opposed slots for receiving and guiding the jacket inserted therein to a home position;
   carrier means having a cone-shaped centering element for insertion through a central opening in the magnetic disk to center the disk in an operative position;
   interlock means pivotably mounted on the guide means adjacent the home position of the jacket and having a cam surface of predetermined configuration for contacting the jacket in the vicinity of the home position;
   spring biasing means for urging the interlock means to a first, rest position when the cam surface is not contacted by the jacket;
   means including a first portion of the cam surface for overcoming the spring biasing force and directing the interlock means to a position of interfering with the movement of the carrier when the jacket is within a predetermined range of its home position but is not in the home position; and
   means including a second portion of the cam surface for driving the interlock means against the spring biasing force to a bypass position in which the carrier may be moved to insert its centering element through the opening in the disk.

2. Apparatus of claim 1 wherein the carrier includes a portion of a predetermined shape adapted to contact the interlock means during movement of the carrier toward the disk with the interlock means in said interfering position but avoid the interlock means during such movement when the interlock means is in either the rest position or the bypass position.

3. Apparatus of claim 2 wherein the carrier portion includes an L-shaped projection defining a laterally displaced portion positioned in alignment with the interlock means when the latter is in the interfering position and a bypass aperture adapted to receive the interlock means when the latter is in the bypass position.

4. Apparatus of claim 1 wherein the interlock means includes an arm pivotably mounted to the guide means and a leaf spring mounted on the arm and bearing against a frame member to urge the arm to a first angular position releasing the carrier for movement toward the disk.

5. Apparatus of claim 4 wherein the interlock means further includes a protrusion extending toward the carrier at the proximal end of the interlock arm for blocking the carrier against movement toward the disk.

6. Apparatus of claim 5 wherein the interlock arm further includes a distal end portion extending from the interlock arm in the direction of the guide means slot along a portion overlapping said slot, the guide means slot being cut away in the vicinity of the distal end portion to permit a jacket sliding within the slot to contact the distal end portion.

7. Apparatus of claim 6 wherein the cam surface is positioned along said distal end portion and includes a first angled ramp portion, a second flat portion adjacent the ramp portion and generally parallel to the edge of the slot, and a third portion projecting toward the opposite guide means from the flat portion at an acute angle therewith.

8. Interlock apparatus for protecting an inserted record member against mutilation by an associated carrier comprising:
   a carrier mounted for movement between a first extended position and a second retracted position, the carrier supporting a driven member adapted to extend through a defined opening in the record member to engage a spindle for driving the record member, the carrier having a projecting interference member including an offset portion and a support portion rigidly connecting the offset portion to the carrier;
   a pair of opposed guide members on opposite sides of the carrier to guide the record member to an operative position;
   a lever member pivotably attached to one end of the carrier and coupled to at least one of the guide members for moving the carrier between the first and second positions;
   at least one interlock member pivotably mounted on one of the guide members in a position to block the movement of the carrier, the interlock member having a spring urging the interlock member to a first released position and a cam surface adapted to engage a portion of the record member when it is inserted in the vicinity of the operative position;
   the cam surface being configured to cause the interlock member to assume a second blocking position to engage the carrier interference member and to prevent the carrier from moving out of its retracted position when the cam surface is contacted by the record member adjacent to but displaced from the operative position by a predetermined distance and to cause the interlock member to assume a third bypass position to bypass the carrier interference member when the cam surface is contacted by the record member in its operative position.

9. In a disk drive unit adapted to drive a flexible magnetic disk loosely encased within a protective jacket, the jacket being insertable within the disk drive unit to a home position in which the disk drive unit is adapted to engage the disk for operatively driving the disk, apparatus comprising:
   guide means for receiving and aligning the jacket as it is inserted toward the home position;
   a carrier movable toward the jacket and disk to engage the disk by movement of a centering member through a central aperture in the disk; and
   means associated with the guide means for engaging the jacket and selectively blocking the carrier against movement toward the disk in accordance with the position of the jacket relative to the home position.

10. Apparatus in a flexible disk drive unit for protecting a flexible disk loosely encased within a protective jacket from mutilation by a centering element when the jacket is inserted in the disk drive within a critical range short of its home position comprising:
   a carrier mounted within the disk drive for movement toward and away from an inserted disk and jacket, the carrier supporting a cone-shaped centering element adapted to extend through an aperture in the disk for centering the disk in its operative position; and
   means for blocking movement of the carrier toward the disk and jacket only when said jacket is within said critical range of its home position, the critical range corresponding generally to the distance between the periphery of the centering opening in the disk and the periphery of a corresponding opening in the jacket, said means including a cam member located to engage the jacket when the jacket is adjacent the home position, the cam member including a lead-in ramp portion and an adjacent flat portion generally parallel to the operative edge of the disk when inserted in the disk drive, the flat portion having a longitudinal extent approximately equal to said distance.

* * * * *